United States Patent Office 3,419,554
Patented Dec. 31, 1968

3,419,554
N-[(1-SUBSTITUTED PIPERIDYL)ALKYLPIPERI-
DINO-ALKYL] DERIVATIVES OF N-CONTAIN-
ING HETEROCYCLIC COMPOUNDS
Jack Bernstein, New Brunswick, N.J., assignor to E. R.
Squibb & Sons, Inc., New York, N.Y., a corporation
of Delaware
No Drawing. Filed June 3, 1966, Ser. No. 554,986
8 Claims. (Cl. 260—243)

This invention relates to novel physiologically active substances of the formula

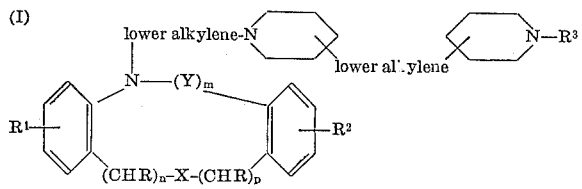

and salts thereof, wherein Y represents CO or CHR, R represents hydrogen, lower alkyl or monocyclic aryl; $R^1$ and $R^2$ may be the same or different and represent hydrogen, halogen, lower alkyl, cyclolower alkyl, cyano, lower haloalkyl, lower alkoxy, lower alkylthio, lower alkylsulfinyl, lower alkylsulfonyl, lower haloalkoxy, lower haloalkylthio, aminosulfonyl, N,N - diloweralkylamino-sulfonyl, nitro, lower alkyl amino or di(lower alkyl) amino; $R^3$ represents hydrogen, lower alkyl (such as methyl, propyl, butyl, etc.), hydroxy-lower alkyl (such as hydroxyethyl, hydroxybutyl, etc.), hydroxy - lower-alkoxy - lower - alkyl (such as hydroxypropoxyethyl, etc.), alkanoyloxylower alkyl (such as heptanoyloxy-ethyl, dodecanoyloxyethyl, etc.), and alkanoyloxy lower-alkoxylower alkyl (such as heptanoyloxypropoxyethyl, dodecanoyloxyethoxypropyl, etc.); X represents oxygen or sulfur; $m$ is 1 when Y represents CO, and 0 or 1 when Y represents CHR, $n$ and $p$ are each 0, 1 or 2, the sum of $m+n+p$ being up to 3.

Preferred compounds of Formula I are those in which $R^3$ is either hydroxyethyl or alkanoyloxyethyl, particularly in those instances wherein the dipiperidine side chain is attached to a phenothiazine nucleus such as 2-(chloro)phenothiazine or 2 - (trifluoromethyl)pheno-thiazine.

The terms "lower alkyl," "lower alkylene" and "lower alkoxy," as employed herein, include both straight and branched chain radicals of less than eight carbon atoms. The term "alkanoyl" includes both straight and branched chain radicals of up to 14 carbon atoms. All four halogens are contemplated.

Salts coming within the purview of this invention include the acid addition salts, particularly the non-toxic acid addition salts, as well as quaternary ammonium salts. Acids useful for preparing the acid addition salts include organic and inorganic acids. The inorganic acids include the hydrohalic acids (e.g., hydrochloric and hydrobromic acids,) sulfuric, sulfamic, nitric and phosphoric acids. The organic acids include aliphatic mono-carboxylic acids such as formic, acetic, propionic, pivalic, stearic and palmitic acids and the like; aliphatic hydroxy monocarboxylic acids such as gluconic, glycolic and lactic acids and the like; aliphatic lower alkoxy monocarboxylic acids such as methoxy-acetic and ethoxy-acetic acids and the like; aliphatic lower alkanoyl mono-carboxylic acids such as pyruvic acid and the like; aliphatic halogeno monocarboxylic acids such as chloro-acetic, dichloroacetic, trichloroacetic and bromoacetic acids and the like; aliphatic dicarboxylic acids such as oxalic, malonic, succinic, methylsuccinic, dimethyl-succinic, glutaric, α-methyl-glutaric, α,α-dimethylglu-taric, β-methylglutaric, itaconic, homoitaconic, maleic, citraconic, homocitraconic, pyrocinchonic, xeronic and fumaric acids and the like; aliphatic hydroxy dicarboxylic acids such as malic and tartaric acids and the like; aliphatic lower alkoxy dicarboxylic acids such as α,β-dimethoxysuccinic and ethoxymaleic acids and the like; aliphatic halogeno dicarboxylic acids such as chloro-succinic and bromosuccinic acids and the like; aliphatic tricarboxylic acids such as aconitic and tricarballylic acids and the like; aliphatic hydroxycarboxylic acids such as citric acid and the like; aryl monocarboxylic or aryl aliphatic monocarboxylic acids such as benzoic, p-aminobenzoic, cinnamic, mandelic, salicyclic, 4 - amino-salicyclic, 2 - phenoxybenzoic, 2 - acetoxybenzoic and nicotinic acids and the like; theophyllineacetic acid and the like as well as 8 - halotheophyllineacetic acids such as 8 - chlorotheophyllineacetic and 8 - bromotheophyl-lineacetic and the like; aryl dicarboxylic acids such as phthalic and pamoic acids and the like; amino acids such as methionine, trytophane, lysine, arginine, aspartic, glutamic and hydroxyglutamic, and the like; organic sulfonic acids such as methane sulfonic, ethane sulfonic, benzene sulfonic, toluene sulfonic and camphor sulfonic acids and the like; hydroxy-alkane sulfonic acids such as 2 - hydroxyethane sulfonic acids and the like; organic sulfamic acids such as cyclohexane sulfamic acid and the like as well as ascorbic acid. The quaternary salts coming within the purview of this invention include those formed with alkyl halides such as methyl chloride, iso-butyl bromide, dodecylchloride, cetyl iodide and the like; benzyl halides such as benzyl chloride and the like; and di-lower alkyl sulfates such as dimethyl sulfate and the like.

The compounds of this invention have utility as antiemetics, tranquilizers, antihistaminics, spasmolytics, antishock agents and potentiators of various drugs such as analgetics and anesthetics. When used as tranquilizers, these compounds have the ability to abate mental disturbances such as anxiety, confusion or excitation without physical incapacitation. In addition, these compounds have chemotherapeutic or anti-microbial activity, such as antibacterial and fungicidal activity. Further, the novel compounds of this invention have a surprisingly low degree of toxicity.

Compounds of this invention are therapeutically active compounds which are utilizable as anticonvulsants and antiepileptics for the treatment of grand mal, petit mal, temporal lobe epilepsy and trigeminal neuralgia. For these purposes, they may be administered orally or parenterally in such form as tablets, capsules, injectables, or the like by incorporating the appropriate dosage of the compound with carriers according to accepted pharmaceutical practices.

The dosage for various mammalian species would be from 1 to 500 mg. administered orally or parenterally once to several times daily, dependent upon the individual requirements of the recipient.

Compounds of Formula I wherein $R^3$ is hydrogen or lower alkyl are prepared by reaction of compounds of the formula (II)
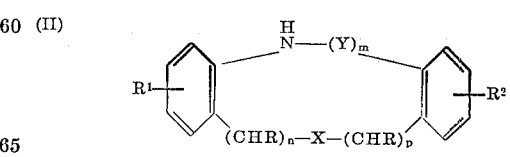

wherein R, $R^1$, $R^2$, X, Y, $m$, $n$ and $p$ are as hereinbefore defined, with a 1-($R^4$)-1'-($R^3$)-alkylenedipiperidine of the formula (III)
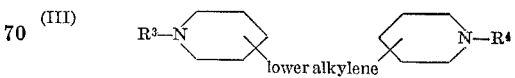

wherein $R^3$ is as hereinbefore defined, and $R^4$ is a halo-lower alkyl radical.

This reaction is carried out by refluxing of the reactants in a solvent such as acetone and in the presence of a condensing agent such as sodium hydroxide or by the treatment of Formula II with a basic condensing agent such as sodium hydride or sodamide in an inert solvent such as toluene or tetrahydrofuran followed by the addition of Formula III, whereupon the desired compound of Formula I is obtained.

Compounds of Formula III wherein $R^4$ is halo-lower alkyl may be prepared, for instance, by the reaction of a hydrohalo acid, such as hydrobromic acid, with the corresponding hydroxyalkyl compound.

The hydroxyalkyl compound ($R^3$=$CH_3$) is produced in turn by the reaction of the piperidylalkylene-1-piperidinealkanol with formaldehyde and formic acid. When $R^3$ is a higher alkyl, the hydroxyalkyl compound is produced by the reduction of the N-acyl derivative, prepared by the acylation of the piperidylalkylene-1-piperidinealkanol.

To prepare compounds of Formula I wherein $R^3$ is hydrogen, lower alkyl, hydroxy lower alkyl, hydroxyalkoxy lower alkyl, alkanoyloxy lower alkyl or alkanoyloxyalkoxy lower alkyl, a compound of the formula (IV)

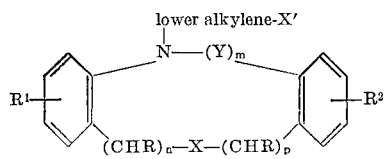

(wherein R, $R^1$, $R^2$, $m$, $n$ and $p$ are as hereinbefore defined, and $X'$ is halogen) is reacted with a compound of the formula (V)

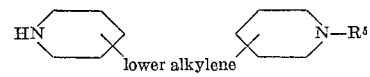

wherein $R^5$ is hydrogen, lower alkyl, hydroxy-loweralkyl, hydroxy-alkoxy-loweralkyl, alkanoyloxylower alkyl or alkanoyloxyalkoxylower alkyl.

This reaction is carried out by refluxing the reactants in a solvent such as methyl ethyl ketone in the presence of sodium or potassium iodide.

Alternatively, compounds of Formul IV may be reacted with a piperidylloweralkylene-1-piperidineloweralkanol to obtain a compound of Formula I wherein $R^3$ is hydroxyalkyl or hydroxyalkoxyalkyl and this product thereafter converted to the desired ester by well-known chemical reactions.

Piperidyl lower alkylene-1-piperidine lower alkanols may be prepared by the reaction of alkylenedipiperidines with hydroxyalkylating agents. Such agents may be haloalkanols, such as 3-bromo-1-propanol, 4-bromo-1-butanol, etc. or they may be alkylene oxides such as 1,2-propyleneoxide or 1,2-butyleneoxide, etc.

The alkylenedipiperidines are readily prepared by the reduction of the corresponding alkylenedipyridines.

Compounds of Formulae II and IV are prepared through any of several processes, dependent upon the particular product desired, as set forth in copending U.S. applications, Ser. No. 546,193, filed Apr. 29, 1966 and Ser. No. 551,560, filed May 20, 1966.

Example 1.—10-[2-{4-[3-(1-methyl-4-piperidyl)propyl]-piperidino}ethyl]-2-(trifluoromethyl)phenothiazine, dihydrochloride (a) 4-[3-(1-methyl-4-piperidyl)propyl]-1 - piperidineethanol.—Twenty-five and four-tenths grams of 4-piperidylpropyl-1-piperidineethanol is added portionwise to a mixture of 11.5 grams of 88% formic acid and 9.7 grams of 37% formaldehyde with stirring and cooling. The resulting viscous mixture is heated on a steam bath for 6½ hours. A rapid steady evolution of $CO_2$ occurs for about 15 minutes; then a clear light yellow solution forms. To the solution is added 9 ml. of concentrated hydrochloric acid and the formic acid is removed under reduced pressure from a steam bath. The clear residue is dissolved in 500 ml. of water and made strongly alkaline with 50% sodium hydroxide. An oily precipitate forms which granulates readily on cooling. This is extracted into ether; the ether dried over magnesium sulfate, filtered and allowed to evaporate at room temperature to yield 24 grams of product melting at about 44–45°. This product is in the form of its dihydrate. The anhydrous material is obtained as a liquid by drying 18 hours at 1 mm. over ethanol.

(b) 1-(2-bromoethyl)-1'-methyl-4,4' - trimethylenedipiperidine, dihydrobromide.—To 300 ml. of 48% aqueous hydrobromic acid is added with cooling and stirring 116 grams of 4-[3-(1-methyl-4-piperidyl) - propyl]-1-piperidineethanol and the resulting solution is heated under reflux for 7 hours, allowing about 200 ml. of material boiling at 104–126° to distil off during this heating. The viscous residue is treated with about 2 liters of dry acetone and a white crystalline solid precipitates. This is filtered and dried to yield 93 grams of product melting at about 213–215° (dec.). After recrystallization from absolute alcohol, the product melts at about 213–215° (dec.).

(c) 10 - [2 - {4 - [3 - (1 - methyl - 4 - piperidyl)propyl] piperidino}ethyl] - 2 - (trifluoromethyl)phenothiazine, dihydrochloride.—The free base is liberated from 19.72 grams of 1 - (2 - bromo-ethyl) - 1' - methyl - 4,4' - trimethylenedipiperidine, dihydrobromide by dissolving the dihydrobromide in water, making the solution strongly alkaline with 40% sodium hydroxide and extracting the precipitated oil into toluene. The toluene solution is dried and removed under reduced pressure. This residue and 5.34 grams of 2-(trifluoromethyl)phenothiazine are dissolved in 100 ml. of acetone and with vigorous stirring 4.8 grams of powdered sodium hydroxide is added all at once. The mixture is refluxed with stirring for 3 hours, cooled, filtered and the filtrate concentrated to dryness under reduced pressure. The viscous residue is dissolved in about 500 ml. of dry ether and excess 3.5 N ethereal hydrogen chloride is added. A tan solid precipitates which is filtered and dried to yield 4 grams of product melting at about 260–265° (dec.). After recrystallization from alcohol-ether the product weighs 3.1 grams and melts at about 267–270° (dec.).

Example 2.—4-{3-[1-{3-[2 - (trifluoromethyl)phenothiazin - 10 - yl]propyl} - 4 - piperidyl]propyl} - 1 -piperidineethanol, dihydrochloride A mixture of 17.2 grams of 10-(3-chloropropyl)-2-(trifluoromethyl)phenothiazine, 25.2 grams of 4-(piperidylpropyl) - 1 - piperidineethanol, 7.5 grams of sodium iodide and 250 ml. of methyl ethyl ketone is refluxed with stirring for 8 hours. Most of the solid dissolves and a new solid appears. After cooling the solid is filtered off and the filtrate concentrated under reduced pressure on a steam bath to yield 31 grams of a viscous oil. This oil is dissolved in 300 ml. of ether; the ether is washed with two portions of 100 ml. of water and then extracted with two portions of 100 ml. of 10% hydrochloric acid. The aqueous acid extracts are made strongly alkaline with 50% sodium hydroxide and the semi-solid precipitate is extracted into ether. The ether is dried over magnesium sulfate and evaporated to yield 24.5 grams of viscous residue. To a solution of 16.5 grams of this residue in about 500 ml. of ether is added excess 4.5 N ethereal hydrogen chloride. A light pink solid precipitates, is filtered and dried to yield 17 grams of product melting at about 105–110° (dec.).

Example 3.—12-[2-{4-[3-(1 - methyl-4-piperidyl)propyl] piperidino}ethyl]-2-chloro - 11,12 - dihydro-6H-dibenzo [b,f][1,4]thiazocine, dihydrochloride Following the procedure of Example 1 but substituting an equivalent amount of 2-chloro-11,12-dihydro-6H-dibenzo[b,f][1,4]-thiazocine for the 2-(trifluoromethyl) phenothiazine [1 c], there is obtained the desired 12-[2-{4-[3-(1-methyl - 4 - piperidyl)propyl]piperidino}ethyl]-2 - chloro-11,12-dihydro-6H-dibenzo[b,f][1,4]-thiazocine, dihydrochloride.

Example 4.—4-{3-[1-{3-(11,12-dihydro-6H-dibenzo[b,f][1,4]thiazocin - 12 - yl)propyl} - 4 - piperidyl]propyl}-1-piperidineethanol, dihydrochloride Following the procedure of Example 2 but substituting an equivalent amount of 12-(3-chloropropyl)-11,12-dihydro-6H-dibenzo-[b,f][1,4]thiazocine for the 10-(3-chloropropyl)-2-(trifluoromethyl)phenothiazine, there is obtained the desired 4-{3-[1-{3-(11,12-dihydro-6H-dibenzo[b,f][1,4]thiazocin - 12 - yl)propyl} - 4 - piperidyl]propyl}-1-piperidineethanol, dihydrochloride.

Example 5.—4-{3-[1-{3-[2-(trifluoromethyl)-11,12-dihydro - 6H - dibenzo[b,f][1,4]-thiazocin-12-yl]propyl}-4-piperidyl]propyl}-1-piperidineethanol, dihydrochloride Following the procedure of Example 2 but substituting an equivalent amount of 12-(3-chloropropyl)-11,12-dihydro - 2 - (trifluoromethyl) - 6H - dibenzo[b,f][1,4]thiazocine for the 2-(trifluoromethyl)phenothiazine, there is obtained the desired 4-{3-[1-{3-[2-(trifluoromethyl)-11,12 - dihydro - 6H - dibenzo[b,f][1,4]thiazocin - 12 - yl]propyl}-4-piperidyl]propyl}-1-piperidineethanol, dihydrochloride.

Example 6.—12-[2-{4-[3-(1-methyl-4-piperidyl)propyl]piperidino}ethyl]-2-propyl - 11,12 - dihydro-6H-dibenzo[b,f][1,4]-thiazocine, dihydrochloride Following the procedure of Example 1 but substituting an equivalent amount of 2-propyl-11,12-dihydro-6H-dibenzo[b,f][1,4]thiazocine for the 2-(trifluoromethyl) phenothiazine, there is obtained the desired 12-[2-{4-[3-(1 - methyl - 4 - piperidyl)propyl] - piperidino}ethyl] - 2 - propyl - 11,12 - dihydro - 6H - -dibenzo[b,f][1,4] - thiazocine, dihydrochloride.

Example 7.—5-[2-{4-[3-(1 - methyl-4-piperidyl)propyl]piperidino}ethyl] - 5,11 - dihydrodibenzo[b,e][1,4]thiazepine, dihydrochloride Following the procedure of Example 1 but substituting an equivalent amount of 5,11-dihydrodibenzo[b,e][1,4] thiazepine for the 2-(trifluoromethyl)phenothiazine [1 c], there is obtained the desired 5-[2-{4-[3-(1-methyl-4-piperidyl)propyl] - piperidino}ethyl - 5,11 - dihydrodibenzo [b,e][1,4]thiazepine, dihydrochloride.

Example 8.—10-[2-{2-[3-(1-methyl-2-piperidyl)propyl] piperidino}ethyl] - 2 - (trifluoromethyl)phenothiazine, dihydrochloride (a) 2-[3-(1-methyl-2-piperidyl)propyl]-1-piperidineethanol.—A solution of 42 grams of 2,2′-trimethylenedipiperidine in 80 ml. of ethanol is heated on a steam bath and a solution of 12.5 grams of 2-bromoethanol in 15 ml. of ethanol is added dropwise with vigorous stirring. The reaction mixture is heated on the steam bath for an additional 6 hours. The ethanol is removed by distillation and the residue poured into aqueous alkali. The mixture is extracted with chloroform and the chloroform extracts washed with water and dried over anhydrous magnesium sulfate. The chloroform is removed by distillation and the residue fractionally distilled under reduced pressure to yield the desired 2-[3-(2-piperidyl)propyl]-1-piperidineethanol.

(b) 10 - [2 - {2 - [3 - (1 - methyl - 2 - piperidyl)propyl] piperidino}ethyl] - 2 - (trifluoromethyl)phenothiazine, dihydrochloride.—Following the procedure of Example 1 but substituting the 2-[3-(2-piperidyl)propyl]-1-piperidineethanol for an equal amount of the 4-[3-(4-piperidyl) propyl]-1-piperidineethanol, there is obtained the desired 10 - [2 - {2 - [3 - (1 - methyl - 2 - piperidyl) - propyl] piperidino}ethyl] - 2 - (trifluoromethyl)phenothiazine, dihydrochloride.

Example 9.—4-{3-[1-{3-[7-propoxy-5,11-dihydrodibenzo[b,e][1,4]oxazepin-5-yl]-butyl} - 4 - piperidyl]propyl}-1-piperidineethanol, dihydrochloride Following the procedure of Example 2 but substituting an equivalent amount of 5-(3-chlorobutyl)-7-propoxy-5,11-dihydrodibenzo[b,e][1,4]oxazepine for the 10-(3-chloropropyl)-2-(trifluoromethyl)phenothiazine, there is obtained the desired 4-{3-[1-{3-[7-propoxy-5,11-dihydrodibenzo[b,e][1,4]oxazepin - 5 - yl]butyl} - 4 - piperidyl] propyl}-1-piperidineethanol, dihydrochloride.

Example 10.—4-{3-[1-{3-[8-chloro-10,11-dihydrodibenzo [b,f][1,4]thiazepin-10-yl]propyl}-4-piperidyl]propyl}-1-piperidineethanol, dihydrochloride Following the procedure of Example 2 but substituting an equivalent amount of 10-(3-chloropropyl)-8-chloro-10,11-dihydrodibenzo[b,f][1,4]thiazepine for the 10-(3-chloropropyl)-2-(trifluoromethyl)phenothiazine, there is obtained the desired 4-{3-[1}3-]8-chloro-10,11-dihydrodibenzo[b,f][1,4]thiazepin - 10 - yl]-propyl}-4-piperidyl] propyl}-1-piperidineethanol, dihydrochloride.

Example 11.—4-{3-[1{3-[10,12-dihydro-5H-dibenzo[c,f][1,5]oxazocin - 5 - yl]propyl} - 4 - piperidyl]propyl}-1-piperidineethanol, dihydrochloride Following the procedure of Example 2 but substituting an equivalent amount of 5-(3-chloropropyl)-10,12-dihydro-5H-dibenzo-[c,f][1,5]oxazocine for the 10-(3-chloropropyl)-2-(trifluoromethyl)-phenothiazine, there is obtained the desired 4-{3-[1-{3-[10,12-dihydro-5H-dibenzo [c,f][1,5]axazocin - 5 - yl]propyl} - 4 - piperidyl]propyl}-1-piperideneethanol, dihydrochloride.

Example 12.—4{3-[1-{3-[10,12-dihydro-5H-dibenzo[c,f][1,5]thiazocin - 5 - yl]-propyl}-4-piperidyl]propyl}-1-piperidineethanol, dihydrochloride Following the procedure of Example 2 but substituting an equivalent amount of 5-(3-chloropropyl)-10,12-dihydro-5H-dibenzo[c,f][1,5]thiazocine for the 10-(3-chloropropyl)-2-(trifluoromethyl)phenothiazine, there is obtained the desired 4-{3-[1-{3-[10,12-dihydro-5H-dibenzo [c,f][1,5]thiazocin - 5 - yl]propyl}-4-piperidyl]-propyl}-1-piperidineethanol, dihydrochloride.

Example 13. — 4-{3-[1-{3-[5,6,12,13-tetrahydrodibenzo [b,f][1,5]oxazonin - 5 - yl]-propyl}-4-piperidyl]propyl}-1-piperidineethanol, dihydrochloride Following the procedure of Example 2 but substituting an equivalent amount of 5-(3-chloropropyl)-5,6,12,13-tetrahydrodibenzo[b,f][1,5]oxazonine for the 10-(3-chloropropyl)-2-(trifluoromethyl)phenothiazine, there is obtained the desired 4-{3-[1-{3-[5,6,12,13-tetrahydrodibenzo[b,f][1,5]oxazonin - 5 - yl]propyl}-4-piperidyl]propyl}-1-piperideneethanol, dihydrochloride.

Example 14. — 4{3-[1-{3-[5,6,12,13 - tetrahydrodibenzo [b,f][1,5]thiazonin - 5 - yl]-propyl}-4-piperidyl]propyl}-1-piperidineethanol, dihydrochloride Following the procedure of Example 2 but substituting an equivalent amount of 5-(3-chloropropyl) - 5,6,12,13-tetrahydrodibenzo[b,f][1,5]thiazonine for the 10-(3-chloropropyl)-2-(trifluoromethyl)phenothiazine, there is obtained the desired 4-{3-[1-{3-[5,6,12,13-tetrahydrodibenzo[b,f][1,5]thiazonin - 5 - yl]propyl}-4-piperidyl]propyl}-1-piperidineethanol, dihydrochloride.

Example 15.—4{3-[1-{3-[5,10,12,13 - tetrahydrodibenzo [c,f][1,5]oxazonin - 5 - yl]-propyl}-4-piperidyl]propyl}-1-piperidineethanol, hydrochloride Following the procedure of Example 2 but substituting an equivalent amount of 5-(3-chloropropyl)-5,10,12,13-tetrahydrodibenzo[c,f][1,5]oxazonine for the 10-(3-chloropropyl)-2-phenothiazine, there is obtained the desired 4 - {3 - [1 - {3 - [5,10,12,13 - tetrahydrodibenzo[c,f][1,5]

oxazonin - 5 - yl]propyl}-4-piperidyl]-propyl}-1-piperidineethanol, hydrochloride.

Example 16. — 4-{3-[1-{3-[5,10,12,13-tetrahydrodibenzo[c,f][1,5]thiazonin - 5 - yl]-propyl}-4-piperidyl]propyl}-1-piperidineethanol, hydrochloride Following the procedure of Example 2 but substituting an equivalent amount of 5-(3-chloropropyl)-5,10,12,13-tetrahydrodibenzo[c,f][1,5]thiazonine for the 10-(3-chloropropyl)-2-phenothiazine, there is obtained the desired 4 - {3-[1-{3-[5,10,12,13 - tetrahydrodibenzo[c,f][1,5]thiazonin - 5 - yl]propyl}-4-piperidyl]-propyl}-1-piperidineethanol, hydrochloride.

Example 17. — 11 - [2-{4-[3-(1-methyl-4-piperidyl)propyl]piperidino}ethyl] - 5,11 - dihydrodibenzo[b,f][1,4]oxazocine-12-one, dihydrochloride Following the procedure of Example 1 but substituting an equivalent amount of 5,11-dihydrodibenzo[b,f][1,4]oxazocine-12-one for the 2-(trifluoromethyl)phenothiazine [1, c], there is obtained the desired 11-[2-{4-[3-(1-methyl - 4 - piperidyl)propyl] - piperidino}ethyl] - 5,11-dihydrodibenzo[b,f][1,4]oxazocine-12-one, dihydrochloride.

Example 18. — 4-{3-[1-{3-[2-(trifluoromethyl)phenothiazin - 10 - yl]propyl}-4-piperidyl]propyl}-1-piperidineethanol, ester with heptanoic acid, dihydrochloride To a solution of 28 grams of 4-{3-[1-{3-[2(trifluoromethyl) - phenothiazin - 10 - yl]propyl} - 4 - piperidyl]propyl}-1-piperidineethanol in 100 ml. of anhydrous benzene at 70–75°, there is added dropwise, with vigorous stirring, a solution of 9 grams of heptanoyl chloride in 20 ml. of anhydrous benzene. The mixture is then heated under reflux for two hours and the benzene is removed by distillation under reduced pressure. The residue is suspended in 250 ml. of ether and the mixture shaken with a solution of 5.1 grams of sodium bicarbonate in 100 ml. of water. The ether layer is washed with saturated sodium chloride solution, dried over anhydrous magnesium sulfate and concentrated to leave as the residue the desired 4-{3-[1-{3-[2-(trifluoromethyl)phenothiazin - 10-yl]propyl}-4-piperidyl]propyl}-1-piperidineethanol, ester with heptanoic acid.

The base is dissolved in anhydrous ether and treated with an ethereal solution of hydrogen chloride. The precipitated solid is filtered, washed thoroughly with anhydrous ether and dried under reduced pressure at room temperature to yield the desired 4-{3[1-{3-[2-(trifluoromethyl)phenothiazin - 10 - yl]propyl}-4-piperidyl]propyl}-1-piperidineethanol, ester with heptanoic acid, dihydrochloride.

Example 19.—4-[3-(4-piperidyl)propyl]-1-piperidinepropanol

A solution of 42 grams of 4,4'-trimethylenedipiperidine in 80 ml. of ethanol is heated on a steam bath and a solution of 13.9 grams of 3-bromo-1-propanol in 15 ml. of ethanol added dropwise with vigorous stirring. The reaction mixture is heated on the steam bath for an additional 6 hours. The ethanol is removed by distillation and the residue poured into aqueous alkali. The mixture is extracted with chloroform and the chloroform extracts washed with water and dried over anhydrous magnesium sulfate. The chloroform is removed by distillation and the residue fractionally distilled under reduced pressure to yield the desired 4-[3-(4-piperidyl)propyl]-1-piperidinepropanol.

Example 20.—2-{4-[3-(4-piperidyl)propyl]-1-piperidyl} propanol

A solution of 42 grams of 4,4'-trimethylenedipiperidine in 200 ml. of methanol is heated to 45–50° and a solution of 7.4 grams of 1,2-propylene oxide in 75 ml. of methanol is added slowly. The reaction mixture is kept at 45–50° for 4 hours and allowed to remain at room temperature overnight. The methanol is removed by distillation and the residue is fractionally distilled under reduced pressure to yield the desired 2-{4-[3-(4-piperidyl)propyl]-1-piperidyl}propanol.

Example 21.—4-(3-[1-(3-[2 - (trifluoromethyl) - 11,12-dihydro - 6H - dibenzo[b,f][1,4] - thiazocine - 12 - yl] propyl)-1-piperidineethanol ester of dodecanoic acid, dihydrochloride Following the procedure of Example 17 but substituting equivalent amounts of dodecanoyl chloride for the heptanoyl chloride and 4-(3-[1-(2-(trifluoromethyl)-11,12-dihydro - 6H - dibenzo[b,f][1,4] - thiazocine - 12 - yl] propyl)-4-piperidyl]propyl)-1-piperidineethanol for the 4-(3-[1-(3-[2 - (trifluoromethyl)phenothiazin - 10 - yl] propyl)-4-piperidyl]propyl)-1-piperidineethanol, there is obtained the desired 4-(3-[1-(3-[2-(trifluoromethyl)-11,12 - dihydro - 6H - dibenzo[b,f][1,4]thiazocine - 12-yl]propyl)-1-piperidineethanol ester of dodecanoic acid, dihydrochloride.

Example 22.—10-[2-{4-[2-(1-methyl-4 - piperidyl)ethyl]-piperidino}ethyl] - 2 - (trifluoromethyl)phenothiadine, dihydrochloride Following the procedure of Example 8 but substituting an equivalent amount of 4,4'-ethylenedipiperidine for the 2,2'-trimethylenedipiperidine, there is obtained the desired 10 - [2 - {4 - [2-(1 - methyl - 4 - piperidyl)ethyl]piperidino}ethyl]-2 - (trifluoromethyl)phenothiazine, dihydrochloride.

What is claimed is:
1. A compound selected from the group consisting of a base of the formula

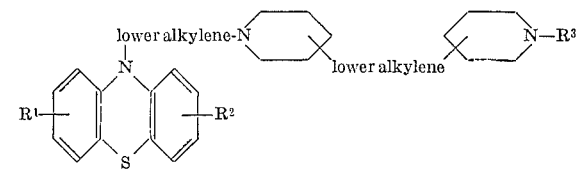

and a pharmaceutically acceptable non-toxic salt thereof, wherein $R^1$ and $R^2$ are each selected from the group consisting of hydrogen, halogen, alkyl having from 1 to 3 carbon atoms, hydroxyalkyl having from 1 to 3 carbon atoms, and trifluoromethyl; $R^3$ is selected from the group consisting of hydrogen, lower alkyl having from 1 to 3 carbon atoms, hydroxy-lower alkyl having from 1 to 3 carbon atoms, alkanoyloxy-lower alkyl wherein the alkanoyloxy group contains from 7 to 12 carbon atoms and the alkyl group contains 2 to 3 carbon atoms, alkanoyloxy-lower alkoxy lower alkyl wherein the alkanoyloxy group contains 7 to 12 carbon atoms and the lower alkoxy and lower alkyl groups each contain 2 to 3 carbon atoms, wherein the lower alkylene groups contain from 2 to 3 carbon atoms, and wherein the alkylenedipiperidine moiety is selected from the group consisting of 2,2'-lower alkylenedipiperidino and 4,4'-lower alkylenedipiperidino.

2. A compound according to claim 1 wherein $R^1$ is hydrogen and $R^2$ is trifluoromethyl.

3. A compound according to claim 2 which is the dihydrochloride salt of 10-[2-{4-[3-(1-methyl-4-piperidyl) propyl]piperidino}ethyl] - 2 - (trifluoromethyl)phenothiazine.

4. A compound according to claim 2 wherein the lower alkylene group is propylene.

5. A compound according to claim 4 which is the dihydrochloride salt of 4-{3-[1-{3-[2-(trifluoromethyl)-phenothiazin-10 - yl]propyl} - 4 - piperidyl]propyl} - 1-piperidineethanol.

6. A compound according to claim 4 which is the dihydrochloride salt of 4-{3-[1-{3-[2-(trifluoromethyl)- phenothiazin - 10 - yl]propyl} - 4 - piperidyl]propyl} - 1-piperidineethyl heptanoate, dihydrochloride.

7. A compound according to claim 1 wherein $R^3$ is selected from the group consisting of hydroxy lower alkyl and alkanoyloxy lower alkyl.

8. A compound according to claim 1 wherein $R^3$ is selected from the group consisting of hydroxy lower alkyl and alkanoyloxy lower alkyl.

No references cited.

HENRY R. JILES, *Primary Examiner.*

HARRY J. MOATZ, *Assistant Examiner.*

U.S. Cl. X.R.

167—65; 260—239, 244, 293, 293.4, 294.7